Oct. 18, 1966    M. PACAK    3,279,270
PULLEY APPARATUS
Filed June 8, 1964    2 Sheets—Sheet 1
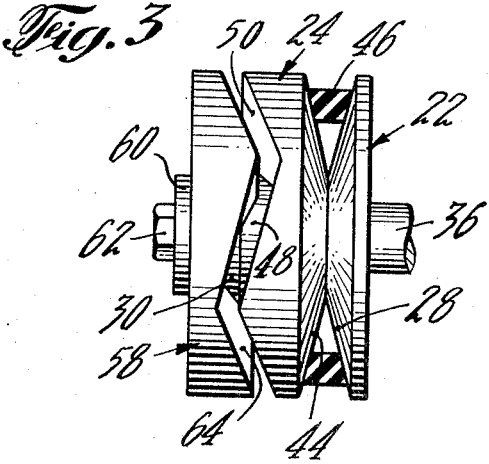
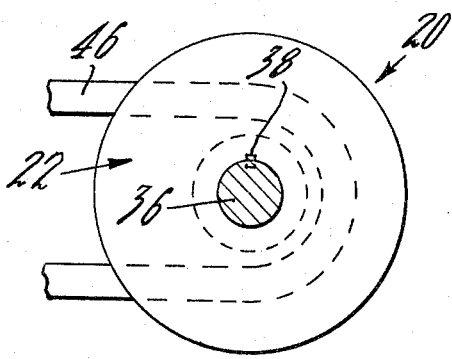
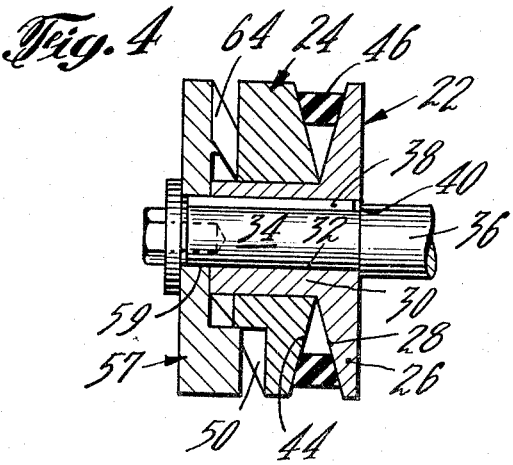
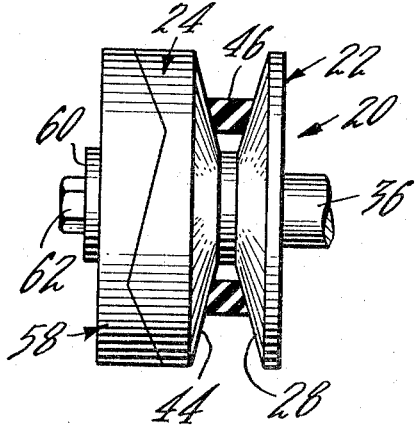
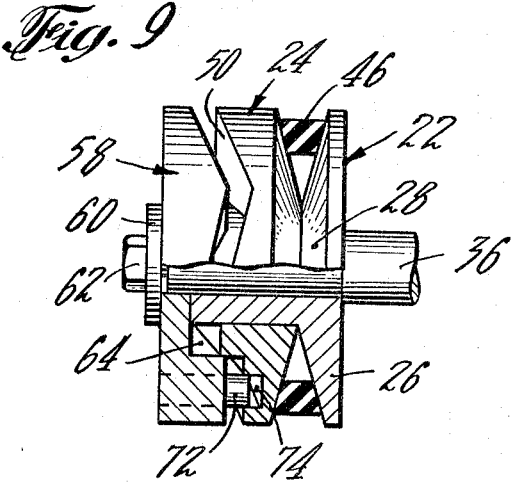
INVENTOR.
MATTHEW PACAK
BY
Teague Stowe & Sadler Oct. 18, 1966    M. PACAK    3,279,270
PULLEY APPARATUS
Filed June 8, 1964
2 Sheets-Sheet 2
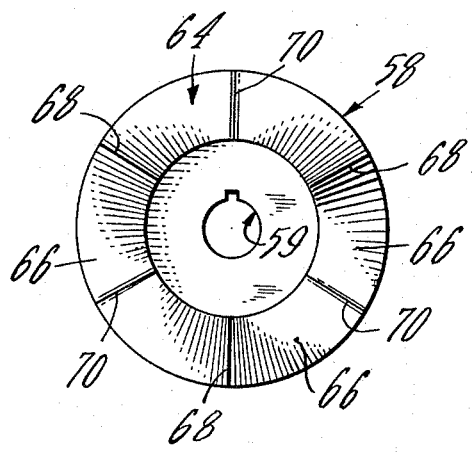
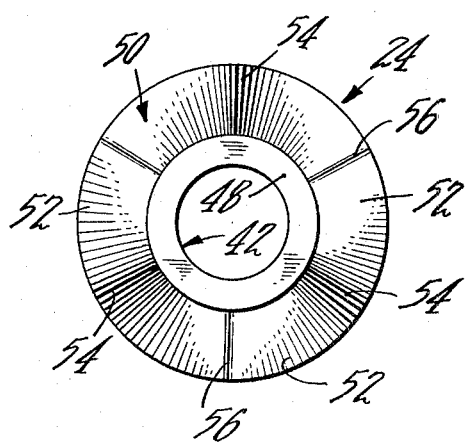
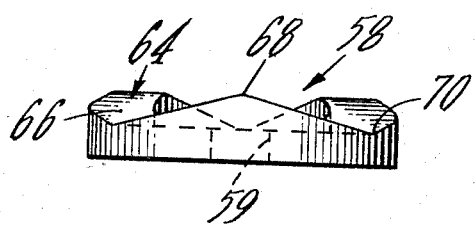
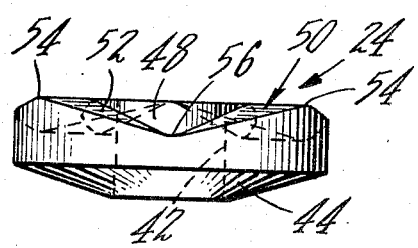
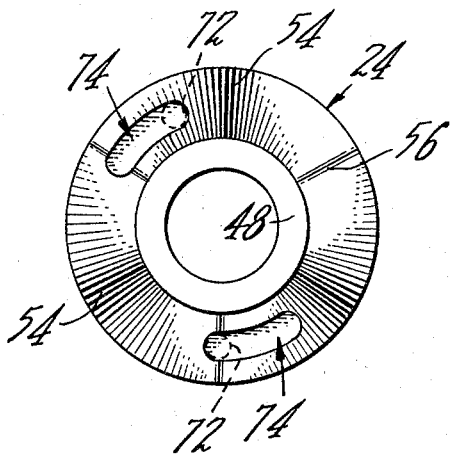
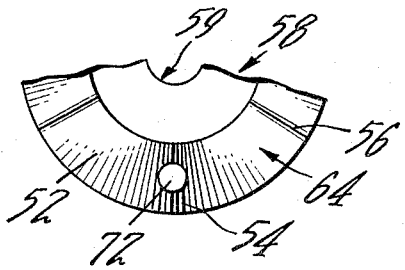
INVENTOR.
MATTHEW PACAK
BY
Teagno Stowe & Sulla

United States Patent Office 3,279,270
Patented Oct. 18, 1966

3,279,270
PULLEY APPARATUS
Matthew Pacak, Solon, Ohio, assignor to Eaton Manufacturing Company, Cleveland, Ohio, a corporation of Ohio
Filed June 8, 1964, Ser. No. 373,201
6 Claims. (Cl. 74—230.17)

This invention relates, generally, to torque transmitting devices of the pulley type.

More specifically, this invention relates to self-compensating, torque transmitting pulley apparatus that is so constituted and arranged as to automatically adjust for slippage occurring between the sheave halves thereof and driving means engageable therewith irrespective of the direction of rotation of the pulley apparatus, such slippage being due to increased loads imposed upon the apparatus during operation.

A primary object of the present invention is to provide a self-compensating, toque transmitting pulley apparatus that is so constituted and arranged as to unusually efficiently, automatically compensate for lengthening of belt-type driving means.

Another primary object of this invention is to provide self-compensating, torque transmitting pulley apparatus comprising compensating means that is so constituted and arranged as to unusually efficiently, automatically compensate for lengthening of belt-type drive means regardless of the direction of rotation of the pulley apparatus.

Still another primary object of the present invention is to provide self-compensating, torque-transmitting pulley apparatus comprising compensating means that is so constituted and arranged as to unusually efficiently, automatically compensate for lengtheining of belt-type driving means irrespective of the direction of travel of the driving means, said compensating means being in engagement with one of the sheave halves of the pulley apparatus to enable said one sheave half to be moved axially with respect to the other sheave half when there is relative rotation between the sheave halves.

A further primary object of the present invention is the provision of self-compensating, torque-transmitting pulley apparatus comprising compensating means that is so constituted and arranged as to unusually efficiently automatically compensate for lengthening of belt-type driving means irrespective of the direction of travel of the driving means, said compensating means comprising a first cam surface formed on one of the sheave halves of the pulley apparatus and a second cam surface formed on a stop member disposed adjacent the one sheave half, the first and second cam surfaces cooperating to enable the one sheave halve to be moved axially of the other sheave half when there is relative rotation therebetween.

Other objects and important features of the invention will be apparent from a study of the specification following taken with the drawing, which together show, illustrate, describe and disclose a preferred embodiment or modification of the invention and what is now considered to be the best mode of practicing the principles thereof. Other embodiments or modifications may be suggested to those having the benefit of the teachings herein, and such other embodiments or modifications are intended to be reserved especially as they fall within the scope and spirit of the subjoined claims.

In the drawings:

FIGURE 1 is a side elevational view of a pulley apparatus constructed in accordance with the principles of the instant invention;

FIGURE 2 is a front elevational view of the pulley apparatus of FIGURE 1;

FIGURE 3 is an elevational view similar to FIGURE 2, showing the pulley apparatus in a compensated position;

FIGURE 4 is an elevational view similar to FIGURE 3, showing the components of the pulley apparatus in section;

FIGURE 5 is a plan view of the stop member utilized in the pulley apparatus of FIGURES 1 through 4;

FIGURE 6 is an elevational view of the stop member shown in FIGURE 5;

FIGURE 7 is a plan view of the axially movable sheave half utilized in the pulley apparatus of FIGURES 1 through 4;

FIGURE 8 is an elevational view of the sheave half shown in FIGURE 7;

FIGURE 9 is a front elevational view, partly in section, of a modified form of pulley apparatus;

FIGURE 10 is a plan view of the axially movable sheave half untilized in the modified pulley apparatus of FIGURE 9; and FIGURE 11 is a partial plan view of the stop member utilized in the modified pulley apparatus of FIGURE 9.

Attention is now directed to FIGURES 1 through 4 of the drawings wherein there is illustrated a self-compensating or automatically compensating, torque-transmitting pulley apparatus 20 which is constructed in accordance with the present invention and which comprises a plurality of sheave halves 22 and 24.

The sheave half 22 comprises a radially outwardly extending, generally circular portion 26 having an annular inclined face 28 which merges with a tube-like hub portion 30. The circular portion 26 and hub portion 30 of the sheave half 22 have a bore 32 extending therethrough in which the reduced end portion 34 of a shaft 36 is disposed. The sheave half 22 is keyed at 38 to the shaft portion 34 or is rigidly secured thereto in any other suitable or conventional manner so as to be nonrotatably mounted on the shaft 36 for rotation therewith. The shaft 36 may be a driving or power input shaft, in which case it would be connected to a suitable drive means such as a reversible motor (not shown), or it may be a driven or power output shaft, in which latter case the shaft 36 would be connected to any suitable means to be driven (not shown). The sheave half 22 is positioned on the reduced end portion 34 of the shaft 36 by the engagement of the circular portion 26 thereof with the annular end face 40 of the shaft 36 (see FIGURE 4).

The sheave half 24 is formed with a central aperture 42 and is slidably and rotatably mounted on the hub portion 30 of the sheave half 22. An annular face 44 is provided on the side of the sheave half 24 adjacent the sheave half 22, the face 44 being inclined similarly, but oppositely to the annular inclined face 28 of the sheave half 22 to define a generally V-shaped annular groove therewith in which a belt 46 or other similar friction type drive means is disposed (see FIGURE 2). The other side of the sheave half 24 includes a central, generally flat annular portion 48 and an annular cam surface 50 disposed radially outwardly of and surrounding the flat annular portion 48. The annular cam surface 50 comprises a plurality of sloping or inclined faces 52 merging in alternating high points 54 and low points 56 which are spaced substantially equally around the cam surface 50 (see FIGURES 7 and 8).

A stop member 58 of generally circular shape and having a central opening 59 is mounted on the end of the reduced end portion 34 of the shaft 36 and is disposed adjacent the end of the hub portion 30 of sheave half 22. The stop member 58 is keyed or otherwise similarly secured to the shaft portion 34 for rotation therewith and is retained thereon in engagement with the end of the hub portion 30 by any suitable means such as a washer 60 and threaded bolt 62 (see FIGURE 4). The side of the stop member 58 adjacent the sheave half 24 is provided with an annular cam surface 64 of substantially the same size and shape as the cam surface 50 of sheave half 24 and in mutually cooperative engagement therewith. The cam surface 64 comprises a plurality of sloping or inclined faces 66 merging in alternating high points 68 and low points 70 which are spaced substantially equally around the cam surface 64 (see FIGURES 2 through 6).

In the operation of the instant pulley apparatus 20, the annular cam surfaces 50 and 64 of the sheave half 24 and stop member 58, respectively, together comprise self-compensating or automatic compensating means for maintaining proper tension in the drive means or belt 46. Loss or lack of tension in the drive belt 46 is induced due to the lengthening thereof during periods of extended usage. This loss of tension produces slack in the belt 46 which, in turn, results in slippage of the belt 46 across the surface of the annular inclined face 28 of the sheave half 22. Slippage between the belt 46 and the sheave half 22 occurs because the frictional force therebetween is overcome by the non-rotatable relationship between the sheave half 22 and the shaft 36. The sheave half 24, however, is rotatable with respect to the shaft 36, since the sheave half 24 is rotatably mounted on the hub portion 30 of the sheave half 22. Thus, the frictional force between the belt 46 and the inclined face 44 of the sheave half 24 precludes slippage therebetween.

It will be readily seen, therefore, that slippage between the belt 46 and the sheave half 22 results in relative rotation between the sheave halves 22 and 24. Since the stop member 58 rotates with the shaft 36, there is also relative rotation between the stop member 58 and the sheave half 24 from the position shown in FIGURE 2 to that shown in FIGURES 3 and 4. The mutual cooperative engagement of the annular cam surfaces 50 and 64 of the sheave half 24 and stop member 58, respectively, causes axial movement of the sheave half 24 on the hub portion 30 in a direction away from the stop member 58 and towards the sheave half 22. The effective diameter of the pulley apparatus is thus increased to again maintain proper tension in the drive means or belt 46 by unusually efficiently eliminating any slack therein. It is noted that because of the configuration of the cooperating cam surfaces 50 and 64, the sheave half 24 will be moved axially towards the sheave half 22 to a compensating position irrespective of the direction of rotation of the sheave half 24 with respect to the stop member 58. The pulley apparatus 20, therefore, is self or automatically compensating regardless of the direction of rotation in which it is driven.

Referring now to the modified form of pulley apparatus shown in FIGURES 9 through 11, when it is desired to have the pulley appartus 20 compensate for reduced tension in the drive means or belt 46 in only one direction of rotation, the annular cam surface 64 of the stop member 58 may be provided with a laterally or axially extending pin 72, and the annular cam surface 50 of sheave half 24 may be provided with one or more arcuate slots or grooves 74 adapted to receive the pin 72 therein. A pair of grooves 74 are shown in FIGURE 10 so that the pulley apparatus 20 may be selectively adjusted to compensate in either of two directions of rotation. The stop member 58 may be so positioned on the shaft 36 as to position the pin 72 within either one of the grooves 74 in the sheave half 24 and adjacent one end thereof, as shown in broken lines in FIGURE 10. Thus, depending on the groove 74 chosen, relative rotation between the stop member 58 and sheave half 24 can be prevented in one direction, since the pin 72 is in engagement one end of the respective groove in which it is disposed.

Other objects and important features of the invention will be apparent from a study of the specification following taken with the drawing, which together show, illustrate, describe and disclose a preferred embodiment or modification of the invention and what is now considered to be the best mode of practicing the principles thereof. Other embodiments or modifications may be suggested to those having the benefit of the teachings herein, and such other embodiments or modifications are intended to be reserved especially as they fall within the scope and spirit of the subjoined claims.

What is claimed is:

1. In a self-compensating torque-transmitting pulley apparatus mounted on a rotatable shaft,
   a plurality of sheave halves defining the effective diameter of said pulley apparatus,
   one of said sheave halves being secured to said shaft for rotation therewith and having an axially extending rub portion surrounding a portion of said shaft,
   a stop member secured to said shaft for rotation therewith and disposed adjacent the end of said hub portion,
   the other of said sheave halves being rotatable and slidably mounted on said hub portion between said stop member and said one sheave half,
   said stop member and said other sheave half having mutually facing and cooperatively engageable annular cam surfaces for enabling said other sheave half to move axially on said hub portion when there is relative rotation between said sheave halves,
   and means for preventing further axial movement of said other sheave half on said hub portion when there is a predetermined relative rotation of said sheave halves.

2. The pulley apparatus as recited in claim 1 wherein said means comprises:
   a pin mounted on said stop member and extending axially from said cam surface thereof, and
   an arcuate groove in said cam surface of said other sheave half and adapted to receive said pin therein.

3. The pulley apparatus as recited in claim 2 wherein said pin and groove arrangement permits said axial movement of said other sheave half in only one rotational direction of said shaft.

4. The pulley apparatus as recited in claim 1 wherein said means comprises:
   a pin mounted on said stop member and extending axially from said cam surface thereof, and arcuate grooves in opposite cam surfaces of said other sheave half and adapted to receive said pin therein.

5. The pulley apparatus as recited in claim 4 wherein said stop member pin can be rotated 180° to place the pin in an opposite groove permitting said axial movement of said other sheave half in either of opposite rotational directions of said shaft.

6. In a self-compensating torque-transmitting pulley apparatus mounted on a rotatable member,
   a plurality of sheave halves defining the effective diameter of said pulley apparatus,
   one of said sheave halves being non-rotatably mutually cooperatively engageable with said rotatable member,
   a stop member non-rotatably mutually cooperatively engageable with said rotatable member, the other of said sheave halves being disposed between said stop member and said one sheave half and being axially movable therebetween and rotatable with respect thereto, and compensating means effective when there is relative rotation between said sheave halves comprising mutually facing and cooperatively engageable annular cam surfaces of sloping faces on said stop member and said other sheave half, said cam surface faces are alternately oppositely sloped and merge in alternating high and low points which are substantially equally spaced around said cam surfaces.

References Cited by the Examiner

UNITED STATES PATENTS

| 2,050,358 | 8/1936 | McElroy et al. | 74—230.17 |
| 2,191,531 | 2/1940 | Judelshon | 74—230.17 |
| 2,900,834 | 8/1959 | Bessette | 74—230.17 |
| 3,195,364 | 7/1965 | Pauli | 74—230.24 X |

FOREIGN PATENTS

| 1,001,901 | 1/1957 | Germany. |

DAVID J. WILLIAMOWSKY, *Primary Examiner.*

L. H. GERIN, *Assistant Examiner.*